United States Patent
Hamerski

(10) Patent No.: US 6,835,452 B1
(45) Date of Patent: Dec. 28, 2004

(54) ADHESIVE ARTICLE WITH PROGRESSIVE ADHESIVE PROPERTIES AND METHOD OF USING SAME

(75) Inventor: Michael D. Hamerski, Township of Baldwin, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 142 days.

(21) Appl. No.: 09/586,119

(22) Filed: Jun. 2, 2000

(51) Int. Cl.⁷ .................. B32B 15/04; B32B 33/00; A47G 1/17
(52) U.S. Cl. .............. 428/343; 428/40.1; 428/208; 428/354; 248/205.3; 248/467
(58) Field of Search .............. 428/343, 40.1, 428/354, 208; 248/205.3, 467

(56) References Cited

U.S. PATENT DOCUMENTS

| | | | |
|---|---|---|---|
| 4,024,312 A | | 5/1977 | Korpman |
| 4,472,480 A | | 9/1984 | Olson |
| 5,468,231 A | * | 11/1995 | Newman et al. ............ 604/180 |
| 5,516,581 A | | 5/1996 | Kreckel et al. |
| 5,626,931 A | * | 5/1997 | Luhmann ................ 428/40 |
| 6,001,471 A | * | 12/1999 | Bries et al. ............... 428/343 |
| 6,191,338 B1 | * | 2/2001 | Haller ....................... 602/55 |

FOREIGN PATENT DOCUMENTS

| | | |
|---|---|---|
| DE | 33 31 016 | 11/1984 |
| WO | WO 95/06691 | 3/1995 |
| WO | WO 98/21285 | 5/1998 |
| WO | WO 99/31193 | 6/1999 |
| WO | WO 99/63018 | 12/1999 |
| WO | WO 00/12644 | 3/2000 |

OTHER PUBLICATIONS

Derwent Abstract of DE 3340598A.*
Abstract and English translation of JP 2001-279198.*

* cited by examiner

Primary Examiner—Terrel Morris
Assistant Examiner—Victor S. Chang
(74) Attorney, Agent, or Firm—David B. Patchett

(57) ABSTRACT

An adhesive article adapted to attach structures to a substrate and a method of using the same. The adhesive article has a failure mode that minimizes damage to the substrate surface. The adhesive article comprises an adhesive layer having a first adhesive region and a second adhesive region. The first adhesive region is adapted to attach a top portion of the structure to the substrate. The second adhesive region is adapted to attach a bottom portion of the structure to the substrate. The second adhesive region comprises reduced adhesive properties.

11 Claims, 3 Drawing Sheets

ADHESIVE ARTICLE WITH PROGRESSIVE ADHESIVE PROPERTIES AND METHOD OF USING SAME

FIELD OF THE INVENTION

The present invention relates to an adhesive article with a failure mode that minimizes damage to the substrate surface and a method of using the same. The present invention also relates to an adhesive article that can be removed in a reverse peel mode without damaging the substrate.

BACKGROUND OF THE INVENTION

Adhesives provide a convenient and low cost way of mounting various structures, such as picture hangers or utility hooks, to walls and other substrates. The nature of adhesives is such that there is often a possibility of damage to the substrate (wall) when a substantial load is applied to the structure. If the load that is applied to the structure exceeds the weight rating of the structure, or adhesion to the substrate is weak, there is a high probability that a peel mode failure will occur. During a peel mode failure, there is a likelihood of wall damage, typically at the bottom of the structure.

While not being bound by theory, it appears that FIGS. 1–3 illustrate the failure mode, as best understood, of conventional adhesives used to attach articles to walls. As illustrated in FIG. 1, hook 20 is attached to substrate 22 by an adhesive layer 24. Load 26 creates a tensile load that produces a peel force 28 near the top of the hook 20 and a compressive load 30 near the bottom of the hook 20. That is, the load 26 creates peel or cleavage de-bonding at the top of the hook 20. As illustrated in FIG. 2, peel force 28 causes the hook 20 to separate slowly from the substrate 22 near the top of the hook 20. As the hook 20 separates from the substrate 22, a pivot point is created generally in the region 32 near the bottom of the hook 20, increasing the compressive load 30 and the adhesion in the region 32. At some point during the delamination process, the hook 20 makes a transition from compression to peel/cleavage in the region 32. Since the surface area of the interface between the adhesive layer 24 and the substrate surface 34 in the region 32 is relatively small, there is a high probability of failure at the surface 34.

As a result of the increased adhesion in the region 32, damage 36 can be caused to the substrate surface 34, as illustrated in FIG. 3. Portion 38 of the substrate surface 34 typically remains bonded to the adhesive layer 24. Where the substrate surface 34 is paint, wallpaper, wallboard, or a variety of other interior surfaces, the cost of repairing the damaged area can be considerable. In some situations, even a small amount of damage may require the entire wall or room to be repainted.

It is therefore desirable to provide an adhesive article with a failure mode that minimizes damage to the substrate surface. It is also desirable to provide an adhesive article that can be removed from the substrate in reverse peel mode without damaging the substrate.

BRIEF SUMMARY OF THE INVENTION

The present invention relates to an adhesive article adapted to attach structures to substrates and a method of using the same. The present invention also relates to a mounting system for a substrate using the present adhesive article.

The present adhesive article permits the use of a high-strength adhesive to attach structures to substrates, with a failure mode that minimizes damage to the substrate surface. The present adhesive article can either be peel removable or stretch releasing. In some embodiments, the peel removable nature of the adhesive article flows from reduced adhesive properties arranged in the desired direction of peel. In these embodiments, the properties that provide the peel removable nature of the adhesive article also minimize the damage to the substrate surface.

In one embodiment, the adhesive article comprises an adhesive layer having a first adhesive region and a second adhesive region. The first adhesive region is adapted to attach a top portion of the structure to the substrate. The second adhesive region is adapted to attach a bottom portion of the structure to the substrate. The second adhesive region comprises reduced adhesive properties.

In one embodiment, the adhesive article comprises a stretch releasing adhesive tape. The stretch releasing adhesive tape includes a pull-tab adjacent to the second adhesive region.

In another embodiment, the adhesive layer comprises a plurality of adhesive regions with progressively reduced adhesive properties. In another embodiment, a single adhesive region comprises progressively reduced adhesive properties, such as by changing the surface area of the adhesive regions.

In one embodiment, the second adhesive region comprises a surface area greater than or equal to about 22% of a surface area of the adhesive layer. In another embodiment, the second adhesive region comprises a surface area more than about 22% of a surface area of the adhesive layer. The second adhesive region can be selected from the group consisting of release liner material, repositionable pressure sensitive adhesive, polymeric film, paper, scrims, nonwoven fabrics, powder, ink, and low adhesion backsize material.

The present invention is also directed to a mounting system for a substrate. The structure may be a variety of articles, such as hooks, picture mounting tabs and the like.

The present invention is also directed to a method of attaching a structure to a substrate. An adhesive article is prepared comprising an adhesive layer having a first adhesive region and a second adhesive region. The second adhesive region comprises reduced adhesive properties. The adhesive article is attached to the structure so that the first adhesive region extends distally from a top portion of the structure and the second adhesive region extends distally from a bottom portion of the structure. The first and second adhesive regions are attached with the substrate.

In one embodiment, the adhesive layer comprises a plurality of adhesive regions with progressively reduced adhesive properties. The structure can be removed from the substrate by delaminating the adhesive article in the direction from the adhesive region with the lowest adhesive properties toward the adhesive region with the greatest adhesive properties. In another embodiment, the adhesive layer is a stretch releasing adhesive article with a pull tab adjacent to the second adhesive region.

BRIEF DESCRIPTION OF THE SEVERAL VIEWS OF THE DRAWING

The present invention will be further described with reference to the accompanying drawings, in which.

DETAILED DESCRIPTION OF THE INVENTION

Figure 4A:
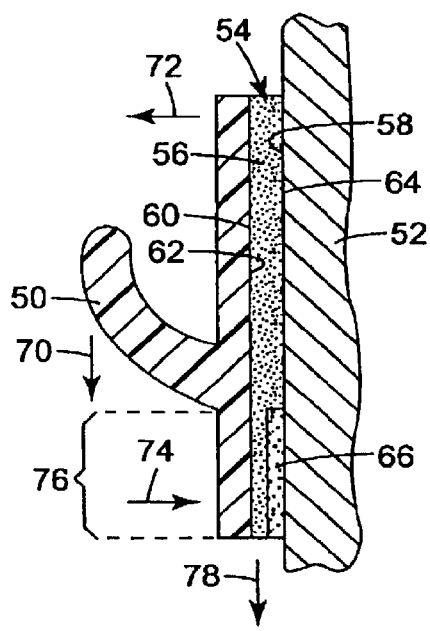
FIG. 4A is a side view of a structure attached to a substrate using an adhesive article in accordance with the principles of the present invention.

FIG. 4A is a side sectional view of a structure 50 mounted to a substrate 52 using an adhesive article 54 in accordance with the principles of the present invention. Although the structure 50 illustrated in FIG. 4A is a hook, any of a variety of structures can be attached to the substrate 52 using an adhesive article in accordance with the principles of the present invention. Adhesive article 54 has a first adhesive layer 56 engaged with substrate surface 58. The first adhesive layer 56 of the adhesive article 54 includes a first adhesive region 64 near the upper portion of the structure 50 and a second adhesive region 66 near the bottom portion of the structure 50. The second adhesive region 66 has reduced adhesive properties. As used herein, "reduced adhesive properties" refers to a region with non-adhesive properties or adhesive properties less than the adhesive properties of the first adhesive region. As such, the concept of reduced adhesive properties is a comparison of the relative adhesive properties of the first and second adhesive regions. Various methods of achieving the reduced adhesive properties are discussed below.

Second surface 60 of adhesive article 54 engages with rear surface 62 of the structure 50. The second surface 60 is typically an adhesive bonded to the rear surface 62 of the structure 50. In some embodiments, the adhesive article 54 may be a two-sided adhesive tape with a backing layer (see e.g., FIG. 5). The backing layer can be paper, a polymeric foam, a polymeric film, a scrim, a nonwoven, or a variety of other materials. The choice of polymeric foam or polymeric film depends on the specific application for the adhesive article 54. Polymeric foams can be chosen to optimize conformability and resiliency properties which are helpful when the adhesive article 54 is to be adhered to surfaces having surface irregularities. Such is the case with a typical wall surface. Polymeric films may be used instead to increase load bearing strength and rupture strength of the tape; however, films are more suitable when the application is to adhere two very smooth surfaces together. As an alternative, solid adhesives can be used instead of the combination of a film or foam with two adhesive layers.

When the structure 50 is subject to tensile load 70, peel force 72 is generated near the top of the structure 50, generally opposite the first adhesive region 64. The first adhesive region 64 counteracts the peel force 72. Simultaneously, a compressive force 74 is generated in region 76 adjacent to the second adhesive region 66. The load 70 also generates a shear force 78. In one embodiment, the second adhesive region 66 is engineered to frictionally engage with the substrate surface 58 to resist shear force 78. For example, the second adhesive region 66 may be a non-adhesive, rubber material that has a high frictional coefficient with respect to the substrate surface 58, but no adhesive properties. A variety of other high friction, non-adhesive materials may be used for the second adhesive region 66, where the selection of the material is determined in part by the nature of the substrate surface 58. In an alternate embodiment, the second adhesive 66 can be formed on both sides of the adhesive article 54 so that the adhesive article 54 is orientation independent. Alternatively, adhesive article 54 in the region 76 can be constructed from a material with reduced adhesive properties (see e.g., FIG. 6).

Figure 4B:
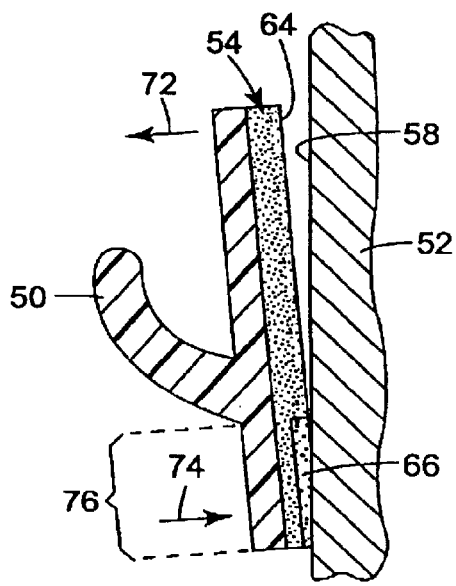
FIG. 4B is a side view of the adhesive article of FIG. 4A delaminating from the substrate in accordance with the principles of the present invention.
Figure 4C:
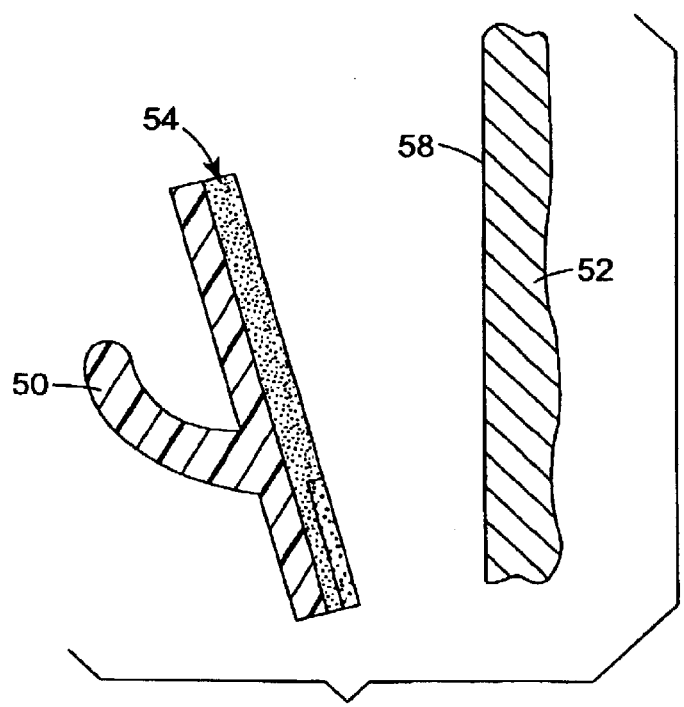
FIG. 4C is a side view of the adhesive article of FIG. 4A delaminated from the substrate in accordance with the principles of the present invention.

FIGS. 4B and 4C illustrate the failure mode of the adhesive article 54 of FIG. 4A. As the load 70 is increased, the peel force 72 causes the first adhesive region 64 to delaminate from the substrate surface 58. As the structure 50 continues to separate from the substrate 52, it pivots against the substrate surface 58 in the region 76 near the bottom of the structure 50, increasing the compressive load 74. The reduced adhesive properties in the region 76 minimize adhesion, even in the presence of the increased compressive load 74.

At some point during the delamination process, the structure 50 makes a transition from compression to peel/cleavage in the region 76. Since the adhesion at the interface between the adhesive layer 54 and the substrate surface 58 in the region 76 is relatively low, there is a low probability of failure at the substrate surface 58. FIG. 4C illustrates the structure 50 completely delaminated without damaging the substrate surface 58.

Figure 1:
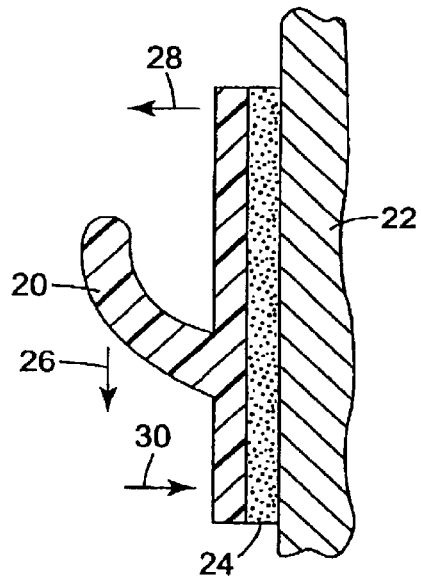
FIG. 1 is a side view of a prior art adhesive layer used to mount a hook structure to a substrate.
Figure 2:
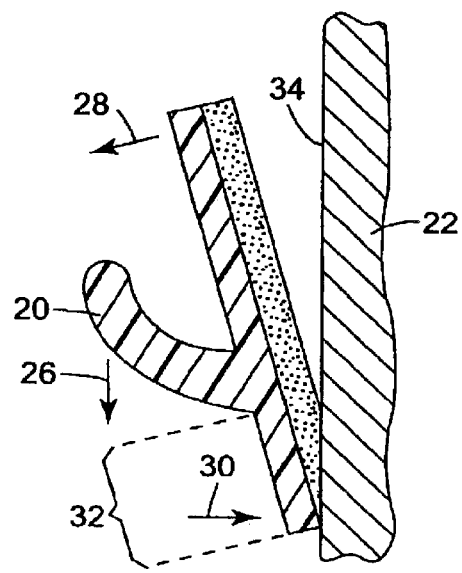
FIG. 2 is a side view of the hook structure of FIG. 1 delaminating from the substrate.
Figure 3:
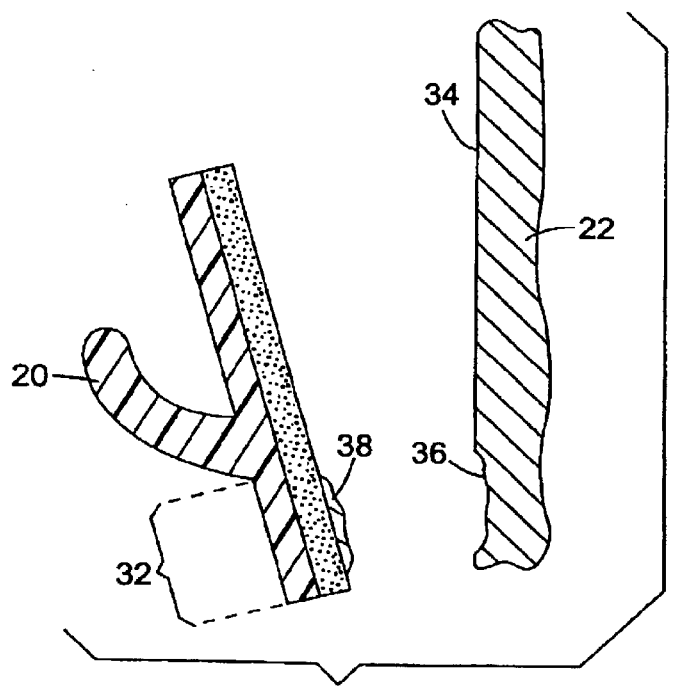
FIG. 3 is a side view of damage caused to the substrate upon removal of the hook structure of FIG. 2.

The size of the second adhesive region 66 having reduced adhesive properties will vary with the application and the nature of the structure 50. If the first adhesive region 64 is too large, it will extend into the region 76 and may cause the damage to the substrate 22 illustrated in FIG. 3. Alternatively, if the second adhesive region 66 is too large, the bond strength between the structure 50 and the substrate 52 may be inadequate for some applications. In the embodiment illustrated in FIG. 4A, the second adhesive region 66 has a surface area greater than or equal to about 22% to about 30% of the surface area of the first adhesive layer 56. In another embodiment, the second adhesive region 66 has a surface area of more than $30\%$ of the surface area of the first adhesive layer 56.

The reduced adhesive properties can be achieved through the application of materials, such as films, papers, powders, foams, scrims, nonwoven fabrics, inks, other coatings and treatments, and the like to render the second adhesive region 66 either non-adhesive or low adhesive. Alternatively, a composition of less aggressive adhesion material can be used in the second adhesive region 66. Such low-adhesion material can be applied directly to the adhesive article 54 or may be coated to the surface 56 of the adhesive article 54 in the region 66. Alternatively, the adhesive can be coated as dots where the density of the dots is decreased to generate the reduced adhesive properties. Alternatively, the surface area of the second adhesive region 66 per unit of length can be reduced to produce the reduced adhesive properties (see FIG. 8).

Any adhesive composition exhibiting a lower adhesion than the adhesive in the first adhesive region 64 is contemplated, including the other compositions of the adhesive materials listed below. Moreover, adhesive detackification or coating techniques can be utilized. One specific example of a low-tack adhesive deemed suitable for many applications is the adhesive used in making Post-it™ repositionable notes which are commercially available from Minnesota Mining and Manufacturing Company of Saint Paul, Minn.

Instead of using a less aggressive adhesive composition to define a reduced adhesive portion, the region 66 can be coated with a release material such as a silicone release coating. Alternatively, the reduced adhesive properties may be produced through molding or profiling of a textured area which significantly reduces adhesive contact. Various techniques for changing adhesive properties are disclosed in U.S. Pat. No. 6,001,471 (Bries et al.).

Figure 5:
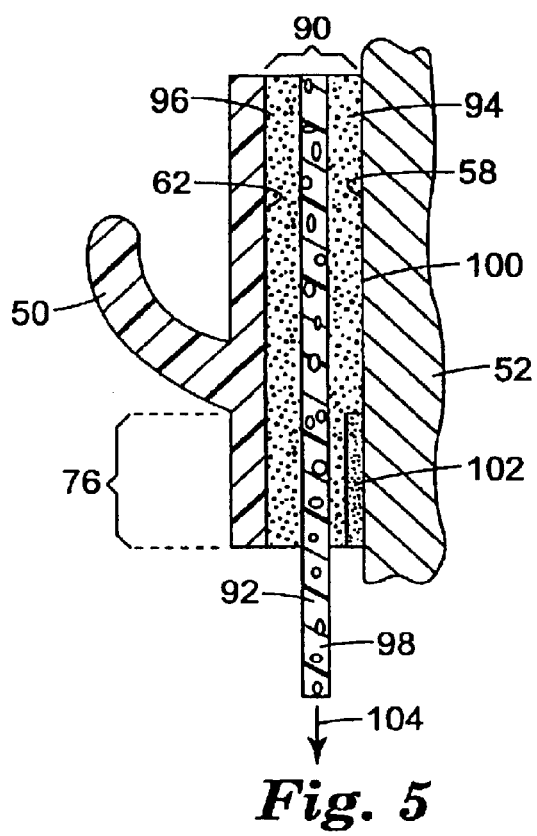
FIG. 5 is a side view of a structure attached to a substrate using an alternate adhesive article in accordance with the principles of the present invention.

FIG. 5 is a side view of an alternate adhesive article 90 for attaching structure 50 to substrate 52 in accordance with the principles of the present invention. The adhesive article 90 comprises a backing layer 92 and adhesive layers 94, 96 of the same or different pressure sensitive adhesive compositions on the opposite major surfaces thereof. The backing layer 92 may be a polymeric film or foam layer chosen to optimize conformability and resiliency properties that are helpful when the adhesive article 90 is adhered to a substrate surface 58 with irregularities. Various backing layers 92 are disclosed in U.S. Pat. No. 6,001,471 (Bries et al.).

Adhesive layer 96 preferably corresponds with rear surface 62 of the structure 50 to which it is adhered such that tab 98 extends from the structure 50 to facilitate stretch removal of the adhesive article 90. Alternatively, the tab 98 can extend from the top or the sides of the structure 50. Adhesive layer 94 comprises a first adhesive region 100 and a second adhesive region 102 located near the bottom of the structure 50. The second adhesive region 102 comprises reduced adhesive properties located at an interface with the substrate surface 58. The second adhesive region 102 minimizes excessive bonding of the region 76 with the substrate surface 58. The reduced adhesive properties of the second adhesive region 102 provide the adhesive article 90 with a failure mode substantially as illustrated in FIGS. 4B–4C.

The structure 50 is removed from the substrate 52 by pulling the tab 98 along the direction 104. The release of adhesive layer 94 progresses substantially even with the release of adhesive layer 96 to achieve complete release of the adhesive layer 94 from the substrate surface 58.

The adhesive article 90 can be selected from any of a family of adhesive articles referred to as stretch releasing adhesive tapes. Stretch releasing adhesive tapes represent an emerging class of high performance pressure-sensitive adhesives combining strong holding power with clean removal and no surface damage. Such stretch releasing adhesive tapes are useful in a wide variety of assembling, joining, attaching, and mounting applications. Any conventionally known stretch releasing tape can be used in the various embodiments of the present invention, including a pressure sensitive adhesive tape with an elastic core, a pressure sensitive adhesive tape with a highly extensible and substantially inelastic core, or a solid pressure sensitive adhesive. These various structures can be used with any embodiment of the present invention.

Specific stretch releasing adhesive tapes suitable for use in the various embodiments of the present invention include the pressure sensitive adhesive tapes with elastic backings described in U.S. Pat. No. 4,024,312 (Korpman), the pressure sensitive adhesive tapes with highly extensible and substantially inelastic backings described in U.S. Pat. No. 5,516,581 (Kreckel et al.) and PCT International Publication No. WO 95/06691 (Bries et al); and the solid pressure sensitive adhesive described in German Patent No. 33 31 016. In addition, the stretch releasing adhesive tape of the present invention can include a splittable layer such as the layers described in PCT International Publication No. WO 98/21285, or a re-fastenable layer such as the layers described in PCT International Publication No. WO 99/31193.

Commercial stretch releasing adhesive tapes include the product sold under the trade designation COMMAND by Minnesota Mining and Manufacturing Company, St Paul, Minn., and the product sold under the trade designation POWER-STRIPS by Beiersdorf AG, Hamburg, Germany. These products are currently manufactured as discrete strips with one end of the strip including a non-adhesive pull tab to facilitate stretching of the strip during removal. The adhesive surfaces of the strip are additionally protected with a release liner.

Any of the adhesive articles disclosed herein may include a release liner to protect the adhesive layer prior to use. Examples of materials suitable for use as liners include kraft papers, polyethylene, polypropylene, polyester or composites of any of these materials which can be coated with release agents such as fluorochemicals or silicone. U.S. Pat. No. 4,472,480 describes low surface energy perfluorochemical liners. The preferred liners are papers, polyolefin films, or polyester films coated with silicone release materials. Examples of the silicone coated release papers are Polyslik trade silicone release papers supplied by James River Co., H.P. Smith Division (Bedford Park, Ill.), and silicone coated papers supplied by DCP-Lohja Inc. (Willowbrook, Ill.).

Figure 6:
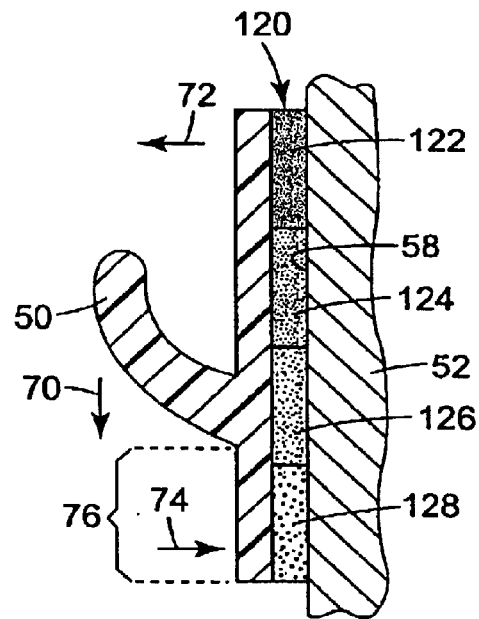
FIG. 6 is a side view of a structure attached to a substrate using another alternate adhesive article in accordance with the principles of the present invention.

FIG. 6 is a side sectional view of an alternate adhesive article 120 in accordance with the principles of the present invention. Adhesive article 120 has a plurality of adhesive regions 122, 124, 126, 128. Adhesive region 122 has the greatest level of adhesion with the substrate surface 58 of the substrate 52. Each of the adhesive regions 124, 126, 128 have a progressively lower level of adhesion and each comprises reduced adhesive properties with respect to regions of high adhesion. For example, adhesive region 124 has a lower level of adhesion than region 122. Consequently, region 124 comprises reduced adhesive properties relative to region 122. Similarly, adhesive region 126 has a lower level of adhesion than regions 122, 124. Adhesive region 128 has the lowest level of adhesion with the substrate surface 58.

Adhesive region 128 is configured to prevent excessive bonding with the substrate surface 58 caused by compressive force 74 when the load 70 is placed on the structure 50 as discussed above. The failure mode of the adhesive article 120 minimizes damage to the substrate surface 58 as generally illustrated in FIGS. 4A–4C.

Figure 7:
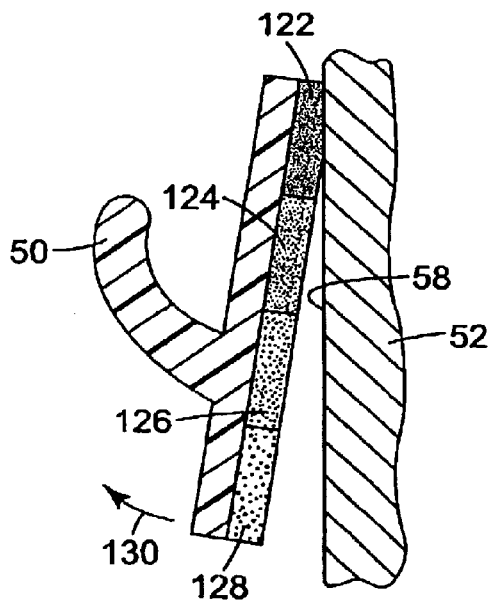
FIG. 7 is a side view of a structure of FIG. 6 being removed from the substrate in accordance with the principles of the present invention.

As illustrated in FIG. 7, the adhesive article 120 of FIG. 6 has the added advantage that the structure 50 can be removed from the substrate surface 58 by delaminating in the direction 130, also referred to as "reverse peel". Reverse peel refers to delaminating a structure in a direction from the region of lowest adhesive properties to the region of highest adhesive properties.

The normal stress applied to the adhesive article 120 when used for vertical mounting is peel force 72 is near the top of the structure 50, generally opposite the adhesive region 122. The adhesive region 122 counteracts the peel force 72. Simultaneously, a compressive force 74 is generated in adhesive region 128. The adhesive properties of the adhesive region 122 need to be greater than the adhesive properties in the region 128. The adhesive properties in the adhesive region 122 preferably are at a level that will not damage the substrate surface 58 during reverse peel. Although the difference in adhesive properties from the region 122 to the region 128 are illustrated as a series of steps, a gradient or gradual change in adhesive properties is also possible (see FIG. 8).

Figure 8:
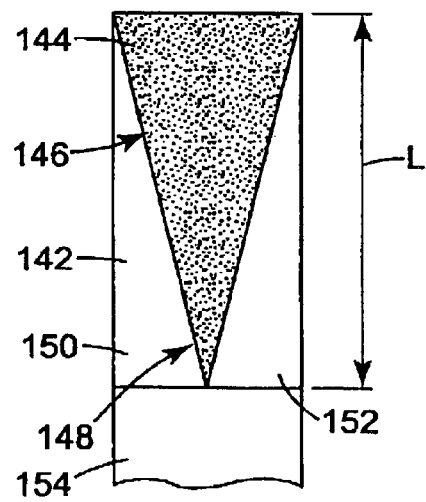
FIG. 8 is a front view of an adhesive article with a progressively reduced adhesive properties in accordance with the principles of the present invention.

Delaminating in the direction 130 reverses the normal forces so that peel is now applied to the areas of the adhesive article 120 that has the weakest peel strength. The structure 50 can be lifted starting at the bottom and gradually working upward through the various adhesive regions. The adhesive regions 122, 124, 126, 128 progressively delaminate from the surface 58 from the region with the lowest level of adhesion 128 to the region of the highest adhesion 122 FIG. 8 illustrates an alternate adhesive article 140 with a backing layer 142 and an adhesive layer 144. The adhesive layer 144 is separated generally into a first adhesive region 146 and a second adhesive region 148. The second adhesive region 148 has reduced adhesive properties relative to the first adhesive region 146 through the use of a reduced surface area. That is, the surface area of the second adhesive region 148 per unit length "L" is less than the surface area of the first adhesive region 146. The failure mode of the adhesive article 140 minimizes damage to the substrate surface 58 as generally illustrated in FIGS. 4A–4C.

The shape of the first and second adhesive regions 146, 148 can vary as long as the overall adhesive surface area in the region 148 is less than the adhesive surface area in the region 146. The reduced surface area in the region 148 can be achieved by coating the adhesive layer 144 in a tapered configuration. Alternatively, the adhesive layer 144 can cover the entire surface area of the backing layer 142 and portions 150, 152 can be modified to have non-adhesive or reduced adhesive properties, such as by application of a non-adhesive liner or a variety of other techniques discussed above. In yet another embodiment, an adhesive article can be cut into non-rectangular shapes so that the reduced surface area in the second adhesive region 148 is achieved with or without the portions 150, 152.

In one embodiment, the adhesive article 140 is a conventional adhesive that can be removed from a substrate by reverse peel, starting in the first adhesive region 148 and progressing toward the second adhesive region 146. In another embodiment, the adhesive article 140 is a stretch releasing adhesive that is removed from a substrate using pull tab 154.

The patents, patent documents, and patent applications cited herein are incorporated by reference in their entirety as if each were individually incorporated by reference. While several embodiments of the invention have been illustrated and described, it will be recognized that various changes and modifications may be made without deviating from the inventive concept set for the above. Any of the features of the various embodiments disclosed herein can be combined. It will be apparent to those of ordinary skill in the art that various changes and modifications may be made without deviating from the inventive concept set forth above. Thus, the scope of the present invention should not be limited to the structures described in this application, but only by the structures described by the language of the claims and the equivalents of those structures.

What is claimed is:

1. An adhesive article adapted to attach structures to a substrate, said article comprising a stretch releasing adhesive tape having an adhesive layer with a first adhesive region adapted to attach a top portion of the structure to the substrate and a second adhesive region with reduced adhesive properties adapted to attach a bottom portion of the structure to the substrate, the stretch releasing adhesive tape including a pull tab adjacent to the second adhesive region.

2. The adhesive article of claim 1 wherein the stretch releasing adhesive tape comprises a multi-layer structure.

3. The adhesive article of claim 1 wherein the stretch releasing adhesive tape comprises a backing layer selected from one of a film, an elastic foam, and an inelastic foam.

4. The adhesive article of claim 1 wherein the stretch releasing adhesive tape is selected from the group consisting of a pressure sensitive adhesive tape with an elastic structural member, a pressure sensitive adhesive tape with a highly extensible and substantially inelastic structural member, or a solid pressure sensitive adhesive.

5. The adhesive article of claim 1 wherein the adhesive layer comprises more than two adhesive regions.

6. The adhesive article of claim 1 wherein the adhesive layer comprises a plurality of adhesive regions with progressively reduced adhesive properties.

7. The adhesive article of claim 1 wherein the adhesive layer comprises progressively reduced adhesive properties.

8. The adhesive article of claim 1 wherein the second adhesive region comprises a surface area less than a surface area of the first adhesive region.

9. The adhesive article of claim 1 wherein the second adhesive region comprises a surface area greater than or equal to about 22% of a surface area of the adhesive layer.

10. The adhesive article of claim 1 wherein the second adhesive region is provided with a material selected from the group consisting of release liner material, repositionable pressure sensitive adhesive, polymeric film, paper, powder, scrims, nonwoven fabric, ink, and low adhesion backsize material.

11. The adhesive article of claim 1 comprising a two-sided adhesive tape article.

* * * * *